United States Patent
Saini et al.

(10) Patent No.: US 11,292,659 B2
(45) Date of Patent: Apr. 5, 2022

(54) PACKAGING SYSTEM FOR AN INFLATABLE ESCAPE SLIDE OF AN AIRCRAFT

(71) Applicant: GOODRICH CORPORATION, Charlotte, NC (US)

(72) Inventors: Mohinder Saini, Karnataka (IN); Raj Kishore, Karnataka (IN); Sandesh Swamidas, Bangalore (IN); Ankita Choudhury, Odisha (IN)

(73) Assignee: GOODRICH CORPORATION, Charlotte, NC (US)

( * ) Notice: Subject to any disclaimer, the term of this patent is extended or adjusted under 35 U.S.C. 154(b) by 142 days.

(21) Appl. No.: 16/784,688

(22) Filed: Feb. 7, 2020

(65) Prior Publication Data
US 2021/0179341 A1    Jun. 17, 2021

(30) Foreign Application Priority Data
Dec. 13, 2019  (IN) .............................. 201911051809

(51) Int. Cl.
| | |
|---|---|
| *B65D 85/07* | (2017.01) |
| *B64D 25/14* | (2006.01) |
| *B65B 53/02* | (2006.01) |
| *B65B 53/06* | (2006.01) |

(52) U.S. Cl.
CPC ............ *B65D 85/07* (2018.01); *B64D 25/14* (2013.01); *B65B 53/02* (2013.01); *B65B 53/06* (2013.01)

(58) Field of Classification Search
CPC ............. B64D 1/12; B64D 25/14; B65D 6/00
See application file for complete search history.

(56) References Cited

U.S. PATENT DOCUMENTS

| | | | | |
|---|---|---|---|---|
| 4,104,964 A | * | 8/1978 | Larkworthy | ............ B65B 63/02 100/232 |
| 4,534,445 A | * | 8/1985 | Fisher | .................... B64D 25/14 182/48 |
| 5,284,453 A | | 2/1994 | Kun | |
| 5,846,620 A | | 12/1998 | Compton | |
| 6,959,658 B2 | * | 11/2005 | Gronlund | ............... B64D 25/14 112/475.01 |
| 7,018,079 B1 | | 3/2006 | Franco-Vila et al. | |
| 9,758,251 B2 | * | 9/2017 | Rushin | ................... B65D 25/20 |
| 10,799,725 B2 | * | 10/2020 | Ordonez | ................ B64D 25/14 |
| 10,836,498 B2 | * | 11/2020 | Haynes | ............. B65D 63/1027 |
| 2015/0033672 A1 | * | 2/2015 | Deshpande | ........... B64D 25/14 53/436 |
| 2018/0022460 A1 | * | 1/2018 | Rushin | .................. B64D 25/14 182/48 |

* cited by examiner

*Primary Examiner* — Bryon P Gehman
(74) *Attorney, Agent, or Firm* — Cantor Colburn LLP

(57) ABSTRACT

Disclosed is a packing system for a slide of an aircraft evacuation system, the packing system having: a rigid packboard having a first side end and a second side end that opposes the first side end; a first valise flap having a first outer end and a first inner end, the first outer end connected to the first side end of the rigid packboard; a second valise flap having a second outer end and a second inner end, the second outer end connected to the second side end of the rigid packboard; and lacing for tying together the first inner end of the first valise flap and the second inner end of the second valise flap, wherein the first valise flap and the second valise flap are formed of a heat shrink material.

20 Claims, 4 Drawing Sheets

PACKAGING SYSTEM FOR AN INFLATABLE ESCAPE SLIDE OF AN AIRCRAFT

CROSS-REFERENCE TO RELATED APPLICATIONS

This application claims the benefit of Indian Patent Application No. 201911051809 filed Dec. 13, 2019, the disclosure of which is incorporated herein by reference in its entirety.

BACKGROUND

The disclosed embodiments relate to aircraft emergency evacuation systems employing an inflatable escape slide and more particularly to a packaging system for an inflatable escape slide.

Emergency evacuation systems that employ inflatable escape slides are installed on virtually all passenger carrying aircraft to provide rapid evacuation of the passengers and crew. During normal aircraft operation, the deflated escape slide is generally packed in a compact package or container that is mounted on the interior surface of the aircraft door or on the floor of the aircraft at a position adjacent the door. In the event of an emergency, the door is opened, and the escape slide is automatically or manually urged through the doorway and inflated so that it extends downwardly from the door sill to the surface of the ground or water.

BRIEF SUMMARY

Disclosed is a packing system for a slide of an aircraft evacuation system, the packing system comprising: a rigid packboard having a first side end and a second side end that opposes the first side end; a first valise flap having a first outer end and a first inner end, the first outer end connected to the first side end of the rigid packboard; a second valise flap having a second outer end and a second inner end, the second outer end connected to the second side end of the rigid packboard; and lacing for tying together the first inner end of the first valise flap and the second inner end of the second valise flap, wherein the first valise flap and the second valise flap are formed of a heat shrink material.

In addition to one or more of the above disclosed aspects or as an alternate, the first valise flap and the second valise flap are formed of a same heat shrink material.

In addition to one or more of the above disclosed aspects or as an alternate, the lacing is formed of a heat shrink material.

In addition to one or more of the above disclosed aspects or as an alternate, the heat shrink material of the valise flaps differs from the heat shrink material of the lacing.

In addition to one or more of the above disclosed aspects or as an alternate, the valise flaps and the lacing are configured so that the valise flaps shrink before the lacing shrinks when heat is applied.

In addition to one or more of the above disclosed aspects or as an alternate, the valise flaps each include a reinforced section, wherein holes are defined in the reinforced section for receiving the lacing.

In addition to one or more of the above disclosed aspects or as an alternate, the packing system further includes grommets within respective ones of the holes.

Further disclosed is a packing system for a slide of an aircraft evacuation system, the packing system comprising: a rigid packboard having a first side end and a second side end that opposes the first side end; a first valise flap set having a first outer end and a first inner end, the first outer end connected to the first side end of the rigid packboard, the first valise flap set including a first set of layers of valise flaps that are layered one on top of the other between a first innermost layer and a first outermost layer and joined to one another at the first outer end and the first inner end; a second valise flap set having a second outer end and a second inner end, the second outer end connected to the second side end of the rigid packboard, the second valise flap set including a second set of layers of valise flaps that are layered one on top of the other between a second innermost layer and a second outermost layer and joined to one another at the second outer end and the second inner end; and lacing for tying together the first inner end of the first valise flap set and the second inner end of the second valise flap set, wherein the first valise flap set and the second valise flap set are formed of a heat shrink material.

In addition to one or more of the above disclosed aspects or as an alternate, the innermost layer of each of the valise flap sets is formed of a different heat shrink material than the outermost layer.

In addition to one or more of the above disclosed aspects or as an alternate, the valise flap sets are configured so that the innermost layer of each of the valise flap sets shrinks before the outermost layer when heat is applied.

In addition to one or more of the above disclosed aspects or as an alternate, adjacent layers of the valise flap sets are sized differently from one another.

In addition to one or more of the above disclosed aspects or as an alternate, the at least the outermost layer of each of the valise flap sets defines one or more perforations.

In addition to one or more of the above disclosed aspects or as an alternate, each layer other than the innermost layer of each of the valise flap sets defines the one or more perforations, and wherein perforations in adjacent layers are offset from one another.

In addition to one or more of the above disclosed aspects or as an alternate, the first valise flap set and the second valise flap set are formed of a same heat shrink material.

In addition to one or more of the above disclosed aspects or as an alternate, the lacing is formed of a heat shrink material.

In addition to one or more of the above disclosed aspects or as an alternate, the heat shrink material of the valise flap sets differs from the heat shrink material of the lacing.

In addition to one or more of the above disclosed aspects or as an alternate, each of the valise flap sets and the lacing are configured so that each of the valise flap sets shrinks before the lacing shrinks when heat is applied.

In addition to one or more of the above disclosed aspects or as an alternate, each of the valise flap sets includes a reinforced section, wherein holes defined in each reinforced section are configured for receiving the lacing.

A method of packing a folded slide of an aircraft evacuation system, comprising: positioning the folded slide onto a rigid packboard of a packing system; positioning, over the folded slide, valise flaps that oppose one another, wherein the valise flaps are connected to side ends of the rigid packboard that oppose one another, and wherein the valise flaps are formed of a heat shrink material; connecting the valise flaps to one another with lacing; and applying heat to the valise flaps to shrink the valise flaps.

In addition to one or more of the above disclosed aspects or as an alternate, the method further includes applying heat to the lacing such that it shrinks at a rate that differs from a valise shrinkage rate of the valise flaps when heat is applied.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
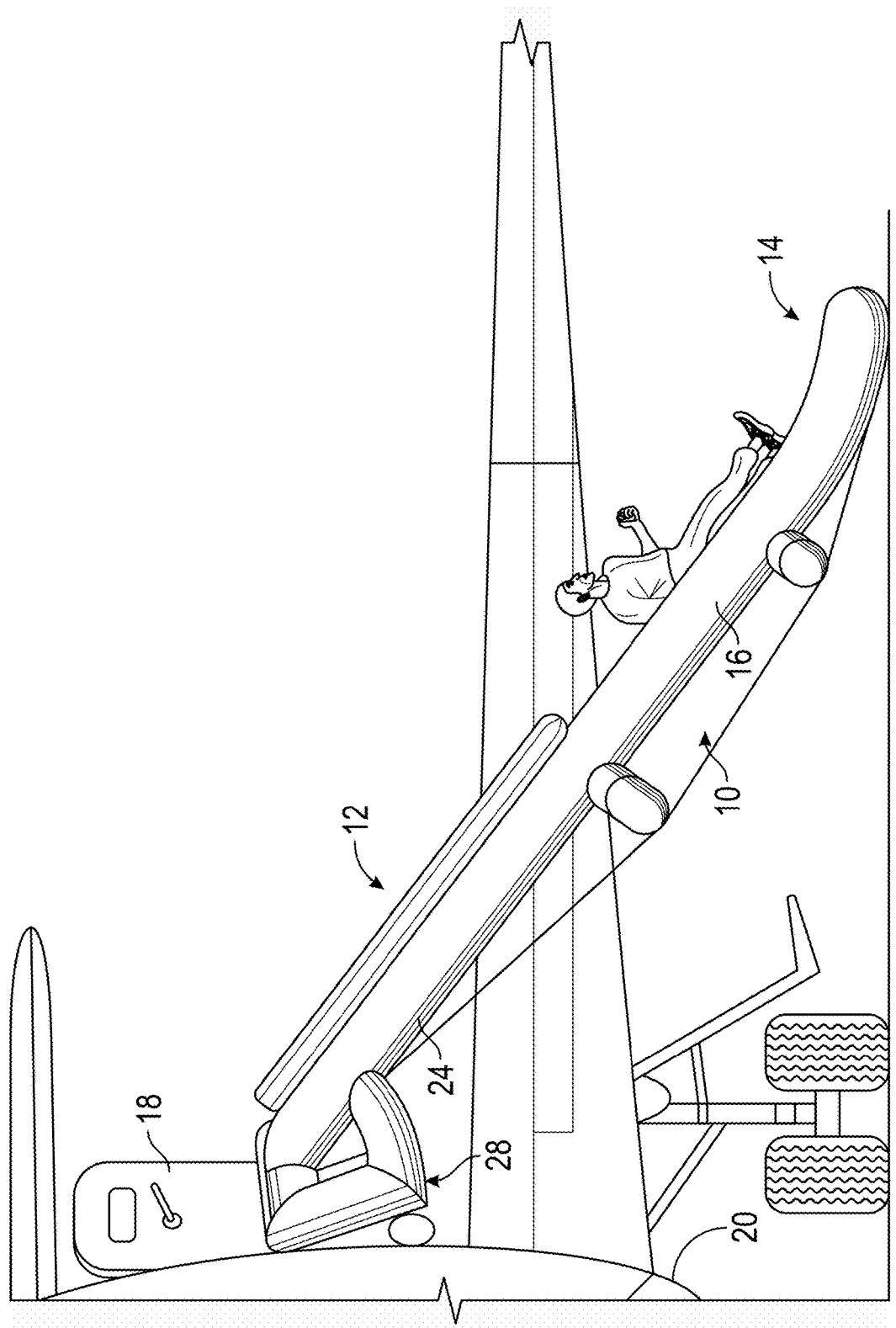
FIG. 1 shows a slide assembly for an evacuation system of an aircraft which may utilize a packing system of one or more of the disclosed embodiments.

FIG. 1 shows an inflatable evacuation slide assembly (slide assembly) 10. The slide assembly 10 generally has a head end 12 and a foot end 14. The head end 12 is configured to couple the slide assembly 10 to an exit door 18 of an aircraft 20. The foot end 14 is in contact with the ground 22. From this, the slide assembly 10 provides a sloping surface to permit the rapid egress of passengers from the aircraft 20. The slide assembly 10 is preferably fabricated from an air impervious material such as a lightweight fabric that has been coated with an elastomer such as rubber or urethane. The various parts of the slide assembly 10 may be joined together with a suitable adhesive. From this, the structure will form a unitary composite structure capable of maintaining its shape during operation. The entire structure of the slide assembly 10 is preferably formed such that all the chambers of the structure are interconnected pneumatically. From this, a single pressurized gas source, such as compressed carbon-dioxide, nitrogen, argon, a pyrotechnic gas generator, or hybrid pyrotechnic/compressed gas generator may be utilized for its deployment. The main body of the slide assembly 10 has a plurality of inflatable beams 16 including a pair of longitudinally extending rail tubes 24 that extend from the head end truss assembly 28 to the ground 22.

The slide is typically packed on a stowage support structure such as a rigid packboard. The packboard attaches to the aircraft door or the fuselage. The evacuation slide is folded with accessories attached and wrapped in a valise (soft pack). In prior art systems, lacing on the valise is tightened using packing hooks so that the slide can meet the required packing dimensions. After tightening the lacings, a vacuum pump may be connected to the slide to remove air from the slide and shrink the packing size further. Packing the slide in available space may be a challenge and require extensive manual labor and time.

To reduce the challenge associated with packing the slide in the valise, as disclosed and illustrated herein, the disclosed embodiments utilize a system that includes one or more valises formed of heat shrink materials to augment the packing process. In addition, the lacing may be provided in the form of a heat shrink material such as woven ropes or threads.

Figure 2:
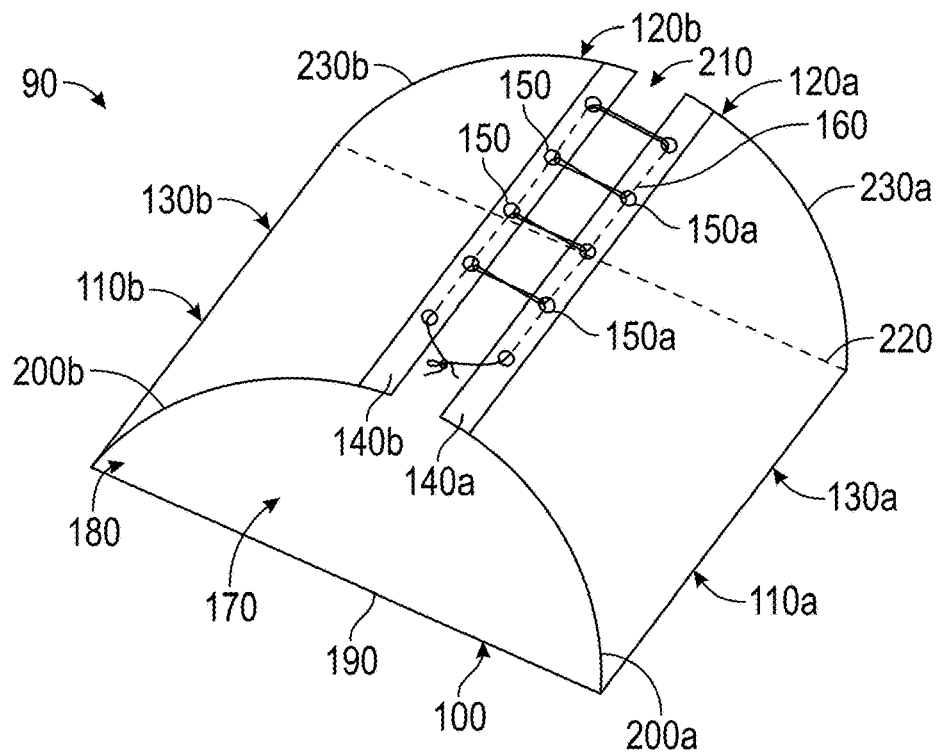
FIG. 2 is a perspective view of a packing system without a slide according to a disclosed embodiment.

Turning to FIG. 2, a packing system 90 is shown according to an embodiment. The packing system 90 includes a rigid packboard 100 upon which a slide will be packed. The rigid packboard 100 includes opposing side ends 110a, 110b, alternatively referred to as a first side end 110a and a second side end 110b.

The packing system 90 includes opposing valise flaps 120a, 120b, alternatively referred to as a first valise flap and a second valise flap. Attached to opposing side ends 110a, 110b of the rigid packboard 100 are ones of the opposing valise flaps 120a, 120b. The valise flaps 120a, 120b may have a same shape and be made of the same material so that discussion herein of one is applicable to the other. The valise flaps 120a, 120b may be formed of a heat shrink material, i.e., that shrinks when exposed to heat.

The valise flaps 120a, 120b have respective outer ends 130a, 130b, alternatively referred to a first outer end and a second outer end. The valise flaps 120a, 120b have respective inner ends 130a, 130b, alternatively referred to a first inner end and a second inner end. For the valise flaps 120a, 120b the outer ends 130a, 130b are attached to the rigid packboard 100. The inner ends 140a, 140b are unattached and oppose one another when placed over a slide. The inner ends 140a, 140b define respective sets of holes 150a, 150b which may be fitted with individual grommets. Lacing 160 may be laced through the sets of holes 150a, 150b so that the opposing valise flaps 120a, 120b may be tied together. The lacing 160 may also be made of a heat shrink material. The inner ends 140a, 140b may be reinforced or stiffened to withstand tension created by the tied lacing 160.

When the valise flaps 120a, 120b are tied to one another, the packing system 90 defines a packing space 170 in which a slide can be packed. A front area 180 of the packing space 170 is defined by a front end 190 of the rigid packboard 100 and front ends 200a, 200b of the respective valise flaps 120a, 120b. A back area 210 of the packing space 170 is defined by a back end 220 of the rigid packboard 100 and back ends 230a, 230b of the respective valise flaps 120a, 120b. It is to be appreciated that as disclosed herein, identifiers such as front, back and side are utilized for reference purposes only.

Figure 3:
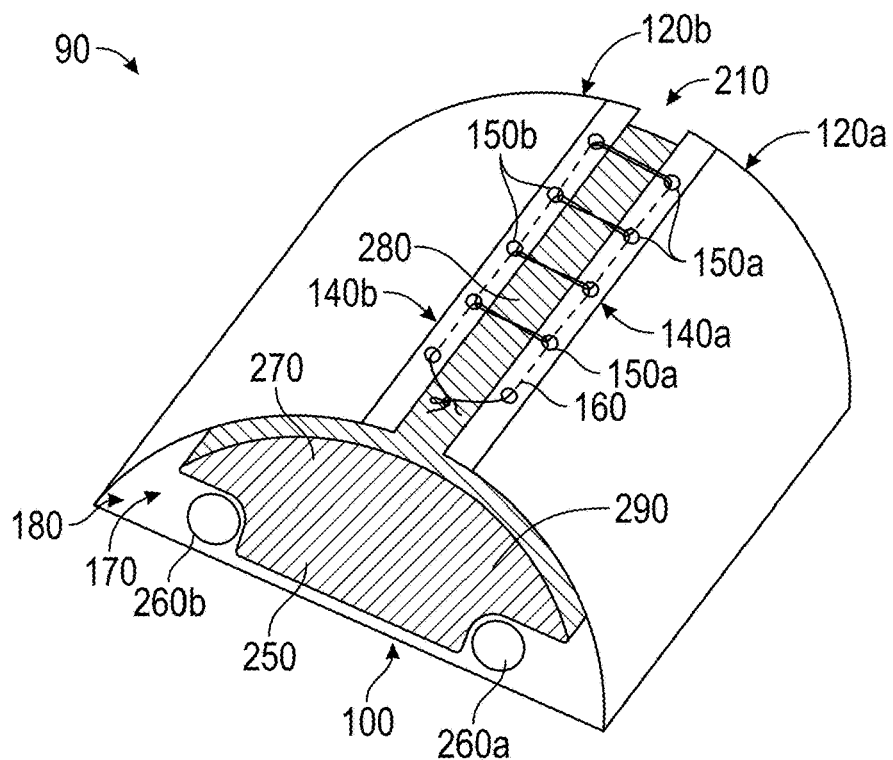
FIG. 3 is a perspective view of the packing system of FIG. 2 with a slide.

Turning to FIG. 3 a slide 250 is packed within the packing system 90. That is, the slide 250 may be folded and placed along with its accessories on the rigid packboard 100. The accessories may include a cylinder 260a and an aspirator 260b. A protective layer 270 that is formed from a heat/fire resistant/retardant fabric may be placed on the slide to protect it from direct application of heat. Then the valise flaps 120a, 120b are laid over a top 280 of the slide 250 so the inner ends 140a, 140b of the valise flaps 120a, 120b are near one another. The lacing 160 is laced through the holes 150a, 150b on the inner ends 140a, 140b of the valise flaps 120a, 120b, manually with minimum tension. This action reduces the overall packing dimension to a certain extent. As illustrated in FIG. 3, at this stage, a front end 290 of the slide 250 is visible through the front area 180 of the packing space 170. Similarly, a back end (not shown) of the slide 250 is visible through the back area 210 of the packing space 170.

Figure 4:
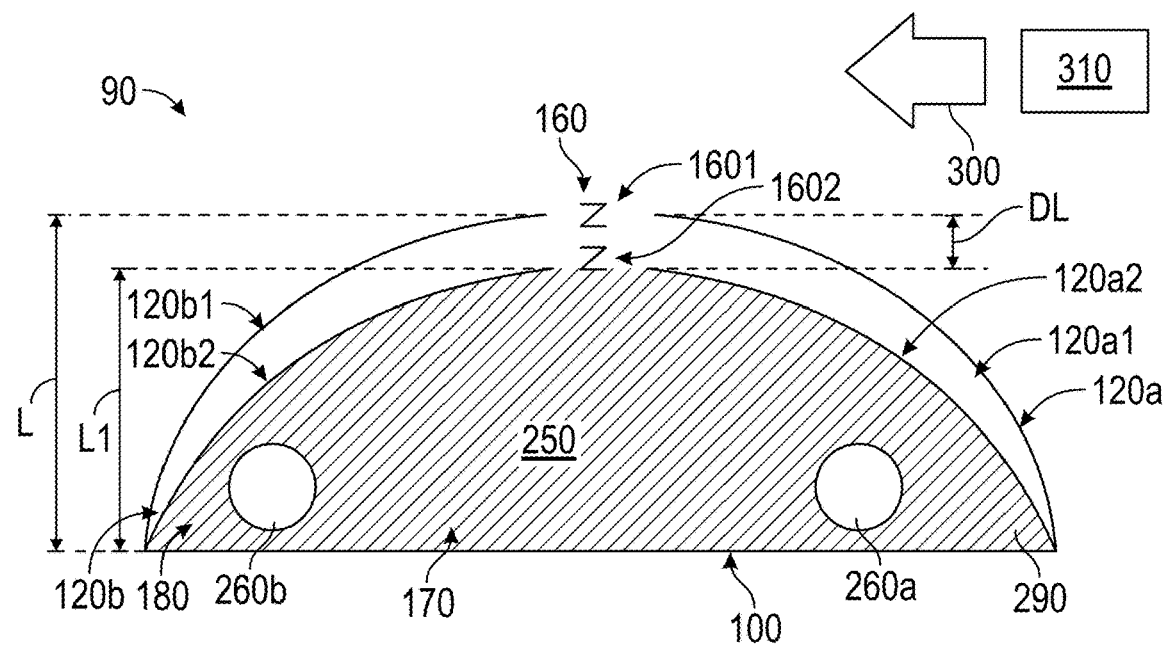
FIG. 4 is a front view of the packing system of FIG. 2 with a slide.

Turning to FIG. 4, the front area 180 of the packing space 170 of the packing system 90 is shown. This shows the front end 290 of the slide 250 including the cylinder 260a and the aspirator 260b. The valise flaps 120a, 120b and the lacing 160 are formed from heat shrink material which may be the same as or different from one another. A flow of heat 300 is applied to the valise flaps 120a, 120b using a heat blower 310 (illustrated schematically) at a predetermined temperature and for predetermined time. The valise flaps 120a, 120b shrink to compress the slide 250 and reduce the packing dimensions. As the flow of heat 300 is applied to the lacing 160, a further reduction of the packing dimension is achieved. Specifically, the valise flaps 120a, 120b have respective first lengths 120a1, 120b1 before being heated and second (smaller) lengths 120a2, 120b2 after being heated. In addition, the laces 160 also shrink from a first size 1601 before being heated to a second (smaller) size 1602 after being heated. This further serves to compress the slide 250. As a result, an initial, uncompressed height L of the packaging system with the slide 250 therein is compressed to a height L1 after being heated to provide a height difference of DL. In addition, the valise flaps and the lacing may be configured, based on material selection, so that the valise flaps shrink before the lacing shrinks when heat is applied. This could either be a function of heat temperature or time of heating and results in a tighter compacting of the slide.

Figure 5:
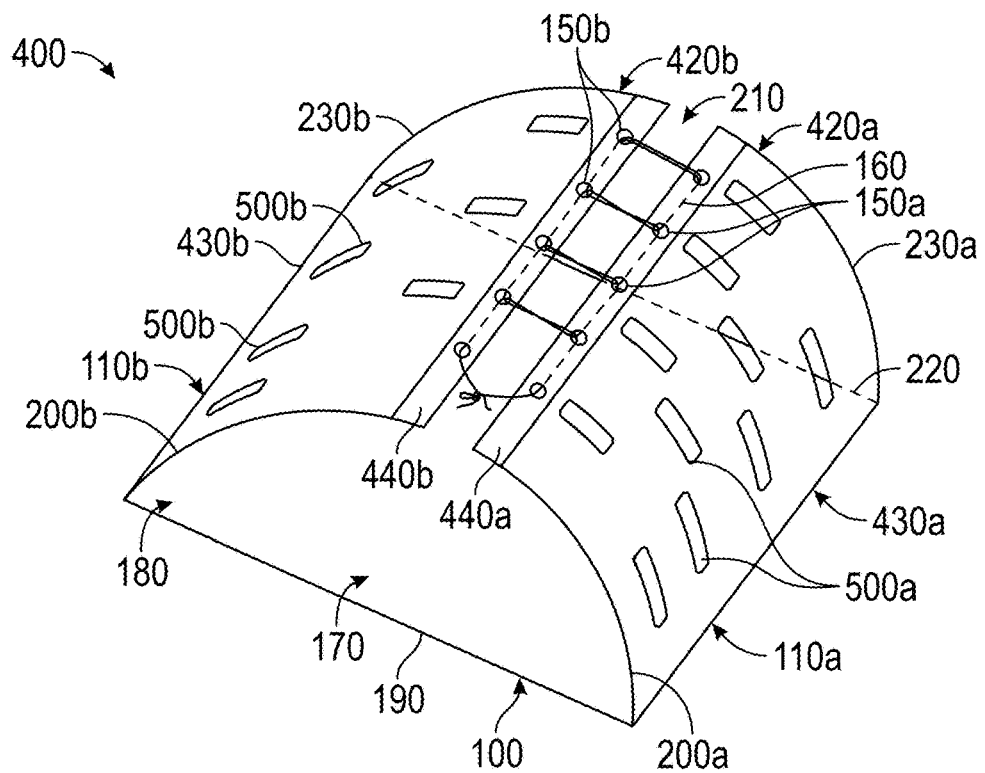
FIG. 5 is a perspective view of a packing system without a slide according to another disclosed embodiment.
Figure 6:
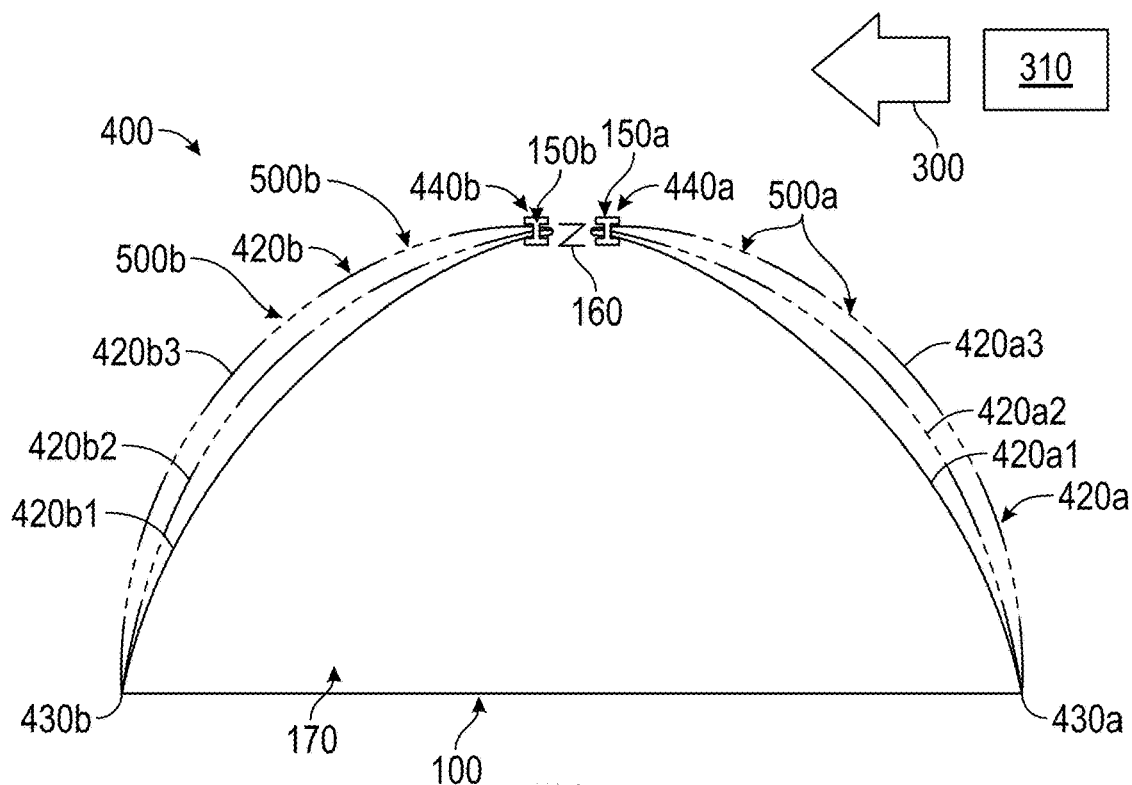
FIG. 6 is a front view of the packing system of FIG. 5 without a slide.

An alternate embodiment of the packing system 400 is illustrated in FIGS. 5 and 6. Aspects of the packing system 400 that are the same as those in the above packing system 90 will have the same reference numbers. The packing system 400 includes a rigid packboard 100 upon which a slide will be packed. The rigid packboard 100 includes opposing side ends 110a, 110b, alternatively referred to as a first side end 110a and a second side end 110b.

The packing system 400 includes opposing valise flaps sets 420a, 420b, alternatively referred to as a first valise flap set and a second valise flap set. Attached to opposing side ends 110a, 110b of the rigid packboard 100 are ones of the opposing valise flap sets 420a, 420b. The valise flap sets 420a, 420b may have a same shape and be made of the same material so that discussion herein of one is applicable to the other. The valise flap sets 420a, 420b may be made of a heat shrink material that shrinks when exposed to heat. The valise flap sets 420a, 420b have respective outer ends 430a, 430b, alternatively referred to a first outer end and a second outer end. The valise flap sets 420a, 420b have respective inner ends 430a, 430b, alternatively referred to a first inner end and a second inner end.

As more clearly illustrated in FIG. 6, each of the valise flap sets 420a, 420b is configured from a plurality of layered valise flaps. For example, each of the valise flap sets 420a, 420b may include three valise flaps layered one on top of the other. That is, one of the valise flap sets 420a may include three valise flap layers 420a1, 420a2, 420a3, where valise flap layers 420a1 and 420a3 are alternatively referred to as a first innermost layer and a first outermost layer. The three valise flap layers 420a1, 420a2, 420a3 are layered one on top of the other and connected to one another at the first outer end 420a and the first inner end 430a.

The other of the valise flap sets 420b may include three valise flap layers 420b1, 420b2, 420b3, where valise flap layers 420b1 and 420b3 are alternatively referred to as a second innermost layer and a second outermost layer. The three valise flap layers 420b1, 420b2, 420b3 are layered one on top of the other and connected to one another at the second outer end 420b and the second inner end 430b. Due to the layering configuration, the first and second innermost valise flap layers 420a1, 420b1 are configured for being positioned against the slide 250.

It is to be appreciated that a fewer or greater number of valise flaps may be in each of the valise flap sets 420a, 420b depending on the packing requirements. The valise flap layers 420a1, 420a2 and 420a3 may be of different width spanning from end 430a to end 440a as shown in FIG. 6. The valise flap layers 420b1, 420b2 and 420b3 may be sized to match respective ones of the valise flap layers 420a1, 420a2 and 420a3 to provide symmetrical tension. This may help in optimizing an overall tension achieved in the packing. In one embodiment, each of the valise flaps in the valise flap sets 420a, 420b may have a same perimeter shape to define a same surface area.

For the valise flap sets 420a, 420b the outer ends 430a, 430b are attached to the rigid packboard 100. The inner ends 440a, 440b define respective sets of holes 150a, 150b which may be fitted with individual grommets. Lacing 160 may be laced through the set of holes 150a, 150b so that the opposing valise flap sets 420a, 420b may be tied together. The lacing 160 may also be made of a heat shrink material that shrinks when exposed to heat.

As more clearly illustrated in FIG. 5, the inner ends 440a, 440b may be reinforced or stiffened to withstand tension created by the tied lacing 160. When the valise flap sets 420a, 420b are tied to one another, the packing system 400 defines a packing space 170 in which a slide is packed. A front area 180 of the packing space 170 is defined by a front end 190 of the rigid packboard 100 and front ends 200a, 200b of the respective valise flap sets 420a, 420b. A back area 210 of the packing space 170 is defined by a back end 220 of the rigid packboard 100 and back ends 230a, 230b of the respective valise flap sets 420a, 420b.

Thus, with the embodiment illustrated in FIGS. 5 and 6, the valise is divided into sets of multiple valise flap layers. The multi-layered valise flap sets 420a, 420b may increase a compression load applied against packed slide. Thus, a number of valise flap layers in each of the valise flap sets 420a, 420b may be selected based upon a size of the slide and required packing density.

The outer (outermost) valise flap layers 420a3, 420b3 may define respective perforation sets 500a, 500b to provide for improved heat transfer to inner layers in each of the valise flap sets 420a, 420b. That is, the blower 310 blows heat downwardly so that the perforation sets 500a, 500b enable heat flow from the blower 310 to more effectively travel between layers in each of the valise flap sets 420a, 420b. The shape, size and density of perforation sets 500a, 500b may be selected based on various factors. For example a strength of the valise fabric for the valises layers in the valise flap sets 420a, 420b may be a factor. An amount of heat transfer required through different valise flap layers in the valise flap sets 420a, 420b may be another factor. The perforation sets 500a, 500b may be staggered (offset) from one another among adjacent layers to increase heat transfer to the inner valise flap layers in the valise flap sets 420a, 420b. The inner (innermost) valise flap layers 420a1, 420b1 of the valise flap sets 420a, 420b may have no perforations because there may be no need to transfer heat downwardly beyond that layer, e.g., into the slide.

The material utilized for the innermost valise flap layers 420a1, 420b1 of the valise flap sets 420a, 402b may shrink more readily than the outermost valise flap layers 420a3, 420b3. The difference in shrinking may be a function of temperature or duration of heating based on the material configuration. This enables the innermost valise flap layers 420a1, 420b1 to compact first, which may increase an effectiveness of the compacting of the different layers. A combination of the number of valise flap layers of a same/ different material and a perforation scheme (including perforation shape) may be selected to achieve a desired pack density of the inflatable slide. In addition, the valise flap layers in the valise flap sets 420a, 420b may be selected to achieve a uniform tension or pull between the layers of valise flap sets 420a, 420b.

Figure 7:
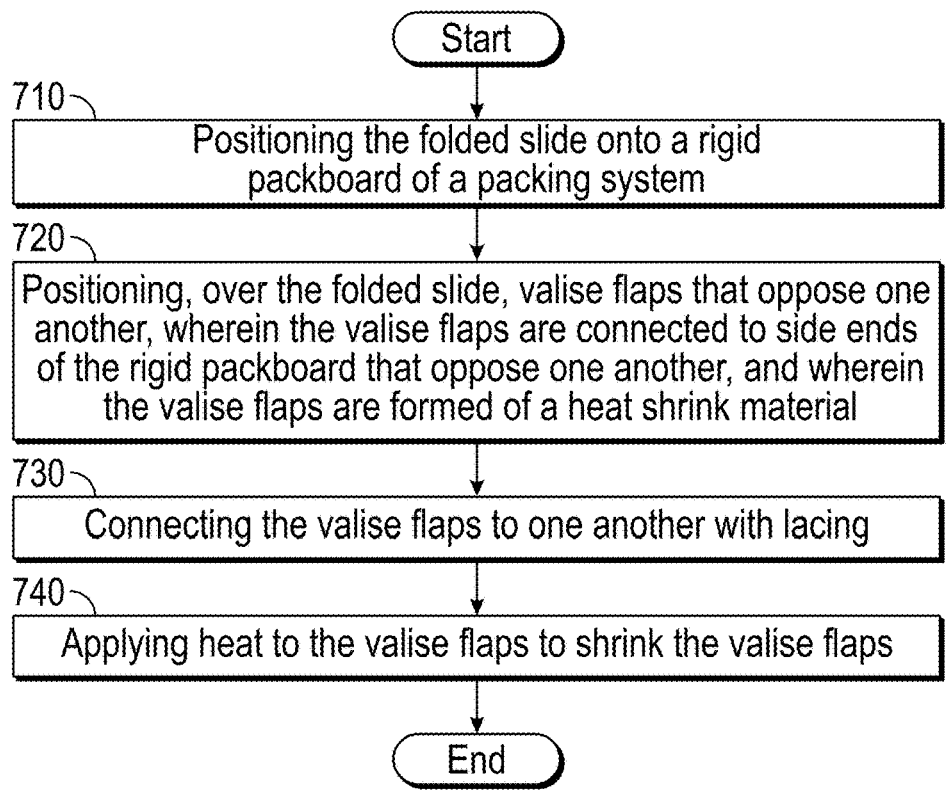
FIG. 7 is a flowchart showing a method of packing a slide in a packing system of one or more of the disclosed embodiments.

FIG. 7 is a flowchart showing a method of packing the slide 250. As shown in block 710 the method includes positioning the folded slide 250 onto the rigid packboard of the packing system 90 (or packing system 400). As shown in block 720 the method includes positioning, over the slide 250, the opposing valise flaps 120a, 120b (or opposing valise flap sets 420a, 420b) that are connected to opposing ends 110a, 110b of the rigid packboard 100. As indicated, the valise flaps 120a, 120b (or valise flap sets 420a, 420b) are formed of a heat shrink material. As shown in block 730 the method includes connecting the valise flaps 120a, 120b (or valise flap sets 420a, 420b) to one another with the lacing 160. As indicated the lacing 160 is laced through opposing ends 140a, 140b (or opposing ends 440a, 440b) of the valise flaps 120a, 120b (or valise flap sets 420a, 420b). The lacing 160 may be formed of a material that is the same as or differs from the heat shrink material of the valise flaps 120a, 120b (or valise flap sets 420a, 420b). As shown in block 740 the method includes applying heat to the valise flaps 120a, 120b (or valise flap sets 420a, 420b) to shrink the valise flaps (or valise flap sets).

Various benefits are achieved by the disclosed embodiments. For example a reduction in effort is required to pack the slide. There is also a reduction in time required for packing a slide resulting in a higher packing rate. In addition, the configuration results in more uniformly loading the valise against the opposing valise slides and the rigid packboard. Moreover, the packing process of the disclosed embodiments is relatively easy to control.

It is to be appreciated that the embodiments are applicable to various types of inflatable structures. In addition to the slide as discussed above the embodiments may be applicable to a raft or other inflatable structure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. A packing system for a slide of an aircraft evacuation system, the packing system comprising:
   a rigid packboard having a first side end and a second side end that opposes the first side end;
   a first valise flap having a first outer end and a first inner end, the first outer end connected to the first side end of the rigid packboard;
   a second valise flap having a second outer end and a second inner end, the second outer end connected to the second side end of the rigid packboard; and
   lacing for tying together the first inner end of the first valise flap and the second inner end of the second valise flap,
   wherein the first valise flap and the second valise flap are formed of a heat shrink material.

2. The packing system of claim 1, wherein the first valise flap and the second valise flap are formed of a same heat shrink material.

3. The packing system of claim 2, wherein the lacing is formed of a heat shrink material.

4. The packing system of claim 3, wherein the heat shrink material of the valise flaps differs from the heat shrink material of the lacing.

5. The packing system of claim 4, wherein the valise flaps and the lacing are configured so that the valise flaps shrink before the lacing shrinks when heat is applied.

6. The packing system of claim 1, wherein the valise flaps each include a reinforced section, wherein holes are defined in the reinforced section for receiving the lacing.

7. The packing system of claim 6, comprising grommets within respective ones of the holes.

8. A packing system for a slide of an aircraft evacuation system, the packing system comprising:
   a rigid packboard having a first side end and a second side end that opposes the first side end;
   a first valise flap set having a first outer end and a first inner end, the first outer end connected to the first side end of the rigid packboard,
   the first valise flap set including a first set of layers of valise flaps that are layered one on top of the other between a first innermost layer and a first outermost layer and joined to one another at the first outer end and the first inner end;
   a second valise flap set having a second outer end and a second inner end, the second outer end connected to the second side end of the rigid packboard,
   the second valise flap set including a second set of layers of valise flaps that are layered one on top of the other between a second innermost layer and a second outermost layer and joined to one another at the second outer end and the second inner end; and
   lacing for tying together the first inner end of the first valise flap set and the second inner end of the second valise flap set,
   wherein the first valise flap set and the second valise flap set are formed of a heat shrink material.

9. The packing system of claim 8, wherein the innermost layer of each of the valise flap sets is formed of a different heat shrink material than the outermost layer.

10. The packing system of claim 9, wherein the valise flap sets are configured so that the innermost layer of each of the valise flap sets shrinks before the outermost layer when heat is applied.

11. The packing system of claim 8, wherein adjacent layers of the valise flap sets are sized differently from one another.

12. The packing system of claim 8, wherein the outermost layer of each of the valise flap sets defines one or more perforations.

13. The packing system of claim 12, wherein each layer other than the innermost layer of each of the valise flap sets defines the one or more perforations, and wherein perforations in adjacent layers are offset from one another.

14. The packing system of claim 8, wherein the first valise flap set and the second valise flap set are formed of a same heat shrink material.

15. The packing system of claim 14, wherein the lacing is formed of a heat shrink material.

16. The packing system of claim 15, wherein the heat shrink material of the valise flap sets differs from the heat shrink material of the lacing.

17. The packing system of claim 15, wherein each of the valise flap sets includes a reinforced section, wherein holes defined in each reinforced section are configured for receiving the lacing.

18. The packing system of claim 8, wherein each of the valise flap sets and the lacing are configured so that each of the valise flap sets shrinks before the lacing shrinks when heat is applied.

19. A method of packing a folded slide of an aircraft evacuation system, comprising:
    positioning the folded slide onto a rigid packboard of a packing system;
    positioning, over the folded slide, valise flaps that oppose one another, wherein the valise flaps are connected to side ends of the rigid packboard that oppose one another, and wherein the valise flaps are formed of a heat shrink material;
    connecting the valise flaps to one another with lacing; and
    applying heat to the valise flaps to shrink the valise flaps.

20. The method of claim 19, further comprising applying heat to the lacing such that it shrinks at a rate that differs from a valise shrinkage rate of the valise flaps when heat is applied.

* * * * *